(12) United States Patent
Fauver et al.

(10) Patent No.: US 11,541,386 B2
(45) Date of Patent: Jan. 3, 2023

(54) BIOPSY SAMPLE MANIPULATION AND IMAGING SYSTEM AND METHODS FOR USE

(71) Applicant: University of Washington, Seattle, WA (US)

(72) Inventors: Mark E. Fauver, Seattle, WA (US); Eric J. Seibel, Seattle, WA (US)

(73) Assignee: University of Washington, Seattle, WA (US)

( * ) Notice: Subject to any disclaimer, the term of this patent is extended or adjusted under 35 U.S.C. 154(b) by 284 days.

(21) Appl. No.: 16/760,186

(22) PCT Filed: Nov. 6, 2018

(86) PCT No.: PCT/US2018/059344
§ 371 (c)(1),
(2) Date: Apr. 29, 2020

(87) PCT Pub. No.: WO2019/090290
PCT Pub. Date: May 9, 2019

(65) Prior Publication Data
US 2020/0346205 A1      Nov. 5, 2020

Related U.S. Application Data

(60) Provisional application No. 62/582,179, filed on Nov. 6, 2017.

(51) Int. Cl.
*G06K 9/00*      (2022.01)
*B01L 3/00*      (2006.01)
(Continued)

(52) U.S. Cl.
CPC .............. *B01L 3/502* (2013.01); *G01N 1/286* (2013.01); *G02B 21/26* (2013.01); *G02B 21/367* (2013.01);
(Continued)

(58) Field of Classification Search
CPC ............. B01L 3/502; B01L 2300/0832; B01L 2300/123; B01L 2200/16; G01N 1/286;
(Continued)

(56) References Cited

U.S. PATENT DOCUMENTS 3,870,395 A    3/1975   Schicketanz
5,616,135 A    4/1997   Thorne
(Continued)

*Primary Examiner* — Tom Y Lu
(74) *Attorney, Agent, or Firm* — McDonnell Boehnen Hulbert & Berghoff LLP

(57) ABSTRACT

An example fluidic device includes an elastic tube, a first actuator coupled to an outer surface of the elastic tube between a first end and a second end of the elastic tube, and a second actuator coupled to the outer surface of the elastic tube between the first actuator and the second end of the elastic tube. The first actuator and the second actuator are configured to move apart from one another to transition a portion of the elastic tube positioned between the first actuator and the second actuator from a first condition to a second condition. A diameter of the elastic tube is greater in the first condition than in the second condition. The fluidic device also includes one or more rotatable components coupled to the first actuator and the second actuator which are configured to rotate the portion of the elastic tube positioned between the first actuator and the second actuator.

18 Claims, 8 Drawing Sheets

(51) Int. Cl.
*H04N 13/207* (2018.01)
*G01N 1/28* (2006.01)
*G02B 21/26* (2006.01)
*G02B 21/36* (2006.01)
*G06T 7/00* (2017.01)

(52) U.S. Cl.
CPC ......... *G06T 7/0012* (2013.01); *H04N 13/207* (2018.05); *B01L 2300/0832* (2013.01); *B01L 2300/123* (2013.01); *G06T 2207/10016* (2013.01); *G06T 2207/30004* (2013.01)

(58) Field of Classification Search
CPC . G01N 1/36; G01N 1/30; G02B 21/26; G02B 21/367; G02B 21/34; G06T 7/0012; G06T 2207/1001; G06T 2207/30004; H04N 13/207
See application file for complete search history.

(56) References Cited

U.S. PATENT DOCUMENTS

| | | |
|---|---|---|
| 7,738,945 B2 | 6/2010 | Fauver |
| 8,867,803 B2 | 10/2014 | Seibel |
| 10,852,191 B2 * | 12/2020 | Yeh .......................... G01J 4/04 |
| 2005/0085721 A1 | 4/2005 | Fauver |
| 2008/0028594 A1 | 2/2008 | Lafont |
| 2009/0208072 A1 | 8/2009 | Seibel |
| 2012/0196320 A1 * | 8/2012 | Seibel ..................... G01N 1/30 |
| | | 348/E13.02 |
| 2014/0308179 A1 * | 10/2014 | Marchiarullo ......... A61B 5/151 |
| | | 422/527 |
| 2016/0220990 A1 | 8/2016 | Seibel |

\* cited by examiner

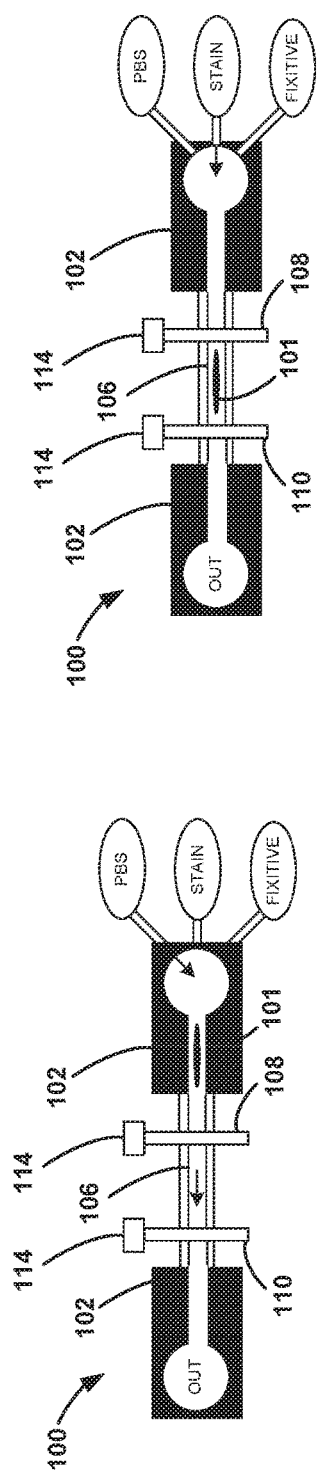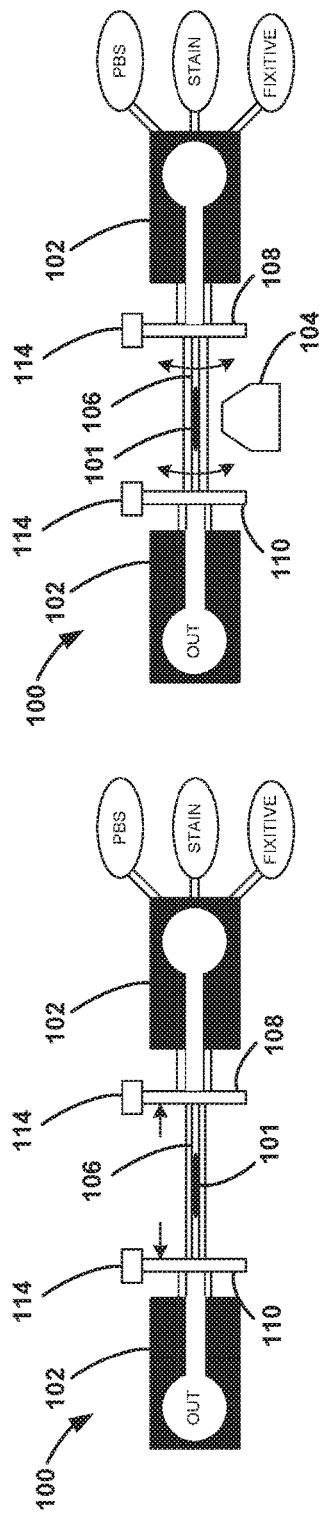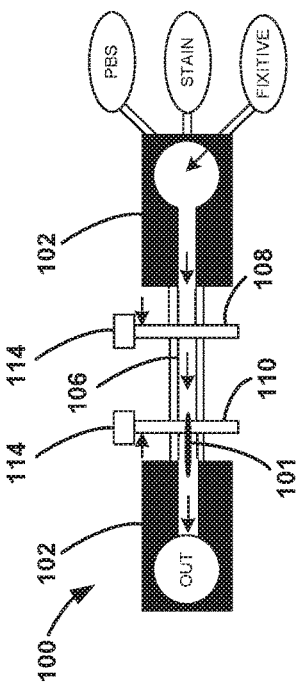

BIOPSY SAMPLE MANIPULATION AND IMAGING SYSTEM AND METHODS FOR USE

CROSS-REFERENCE TO RELATED APPLICATIONS

This application is a U.S. National Phase application of, and claims the benefit of, International (PCT) Application No. PCT/US2018/059344 filed Nov. 6, 2018, which claims priority to U.S. Provisional Patent Application No. 62/582,179, filed Nov. 6, 2017, the contents of each of which are hereby incorporated by reference in their entirety.

BACKGROUND

Unless otherwise indicated herein, the materials described in this section are not prior art to the claims in this application and are not admitted to be prior art by inclusion in this section.

Small samples of human tissue are often required for a definitive disease diagnosis and prognosis. Needle biopsy specimens from tissue are less invasive and costly than surgically removed tissue samples. Typically, these specimens are elongated samples of tissue with a core specimen of 0.3 to 3.0 mm in diameter and up to 2.5 cm in length. Often these needle biopsy tissues are removed from the body in a vital or living state although chemically and mechanically fragile. The processing steps often require chemical fixation using alcohol or formalin to halt unwanted chemical changes and prevent mechanical damage. To provide optical contrast in imaging the cells and tissue, stains are applied to highlight different structures. Immediate and rapid processing of such specimens can provide valuable information, such as whether the needle sampled from the tumor and provided an adequate amount of material to make a diagnosis and chemical analysis. A rapid view of the surface of the needle biopsy can provide this adequacy test, and a higher quality view can provide a disease diagnosis. Deeper views into the tissue or tissue fragments can provide comparative measures of the disease and host immune response and provide a means to stage the cancer and any metastatic growth. These needle biopsies are also valuable for doing more personalized therapies based on genomic (e.g. DNA), transcriptomics (e.g. RNA), proteomic (e.g. protein), metabolomics (e.g. metabolites), glycomics, (collectively "'omics") analysis from the diseased cells and regions and their surrounding cells and tissue matrix.

The current methods of handling needle biopsy specimens is a series of manual steps that end up by adhering the cells or thin sections of the tissue onto glass slides and observing the fixed and stained specimen on an optical microscope. This method takes from several hours to several days and is destructive to the cells and tissue. If the needle did not adequately sample the targeted region, such as a tumor, then the patient will need to return in order to repeat the needle biopsy procedure for a more diagnostic sample. Once the sample is determined to be diagnostic, there are challenges to perform 'omics analysis on the plated and paraffin encased specimen, so often a second needle biopsy is obtained which adds cost, more suffering, and risk of sampling error. Furthermore, the conventional view of the cells and tissue by a cytologist and pathologist is two-dimensional (2D), and depth information is lost.

SUMMARY

Example devices and methods described herein describe various fluidic devices, systems, and methods for use. In particular, the present disclosure provides fluidic devices, systems, and methods for use that enables microscopic imaging around the circumferential surface of a biological specimen sampled from tissue by axially stretching an elastic tube that is holding the specimen, thereby temporarily retaining the specimen so that it may be rotated and imaged with precision.

In one aspect, a fluidic device is provided including (a) an elastic tube having a first end and a second end, (b) a first actuator coupled to an outer surface of the elastic tube between the first end and the second end of the elastic tube, (c) a second actuator coupled to the outer surface of the elastic tube between the first actuator and the second end of the elastic tube, wherein the first actuator and the second actuator are configured to move apart from one another to transition a portion of the elastic tube positioned between the first actuator and the second actuator from a first condition to a second condition, and wherein a diameter of the portion of the elastic tube positioned between the first actuator and the second actuator is greater in the first condition than in the second condition, and (d) one or more rotatable components coupled to the first actuator and the second actuator, wherein the one or more rotatable components are configured such that a rotation of the one or more rotatable components causes the portion of the elastic tube positioned between the first actuator and the second actuator to rotate.

In a second aspect, a system is provided. The system may include (a) the fluidic device of the first aspect, (b) an imaging device positioned adjacent to the portion of the elastic tube positioned between the first actuator and the second actuator, (c) at least one processor, and (d) data storage including program instructions stored thereon that when executed by the at least one processor, cause the fluidic device to perform functions. The functions may include (i) position a biological specimen sampled from tissue in the portion of the elastic tube positioned between the first actuator and the second actuator, (ii) increase, via the first actuator coupled to the elastic tube and the second actuator coupled to the elastic tube, a distance between the first actuator and the second actuator to thereby transition the portion of the elastic tube positioned between the first actuator and the second actuator from a first condition to a second condition, wherein a diameter of the portion of the elastic tube positioned between the first actuator and the second actuator is greater in the first condition than in the second condition, and (iii) rotate, via one or more rotatable components coupled to the first actuator and the second actuator, the portion of the elastic tube positioned between the first actuator and the second actuator including the biological specimen sampled from tissue to a plurality of angular positions.

In a third aspect, a method is provided. The method may include (a) positioning a biological specimen sampled from tissue in an elastic tube of a fluidic device, (b) stretching the elastic tube from a first condition to a second condition, wherein a diameter of the elastic tube is greater in the first condition than in the second condition, and (c) rotating the elastic tube and the biological specimen sampled from tissue to a plurality of angular positions while the elastic tube is in the second condition.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 1A illustrates a simplified block diagram of a fluidic device during delivery of a biological sample, according to an example embodiment.

FIG. 1B illustrates a simplified block diagram of the fluidic device of FIG. 1A during staining of a biological sample, according to an example embodiment.

FIG. 1C illustrates a simplified block diagram of the fluidic device of FIG. 1A during axial tension of the elastic tube, according to an example embodiment.

FIG. 1D illustrates a simplified block diagram of the fluidic device of FIG. 1A during rotation of the elastic tube and imaging of the biological sample, according to an example embodiment.

FIG. 1E illustrates a simplified block diagram of the fluidic device of FIG. 1A during releasing and fixing of the biological sample, according to an example embodiment.

DETAILED DESCRIPTION

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

Figure 2:
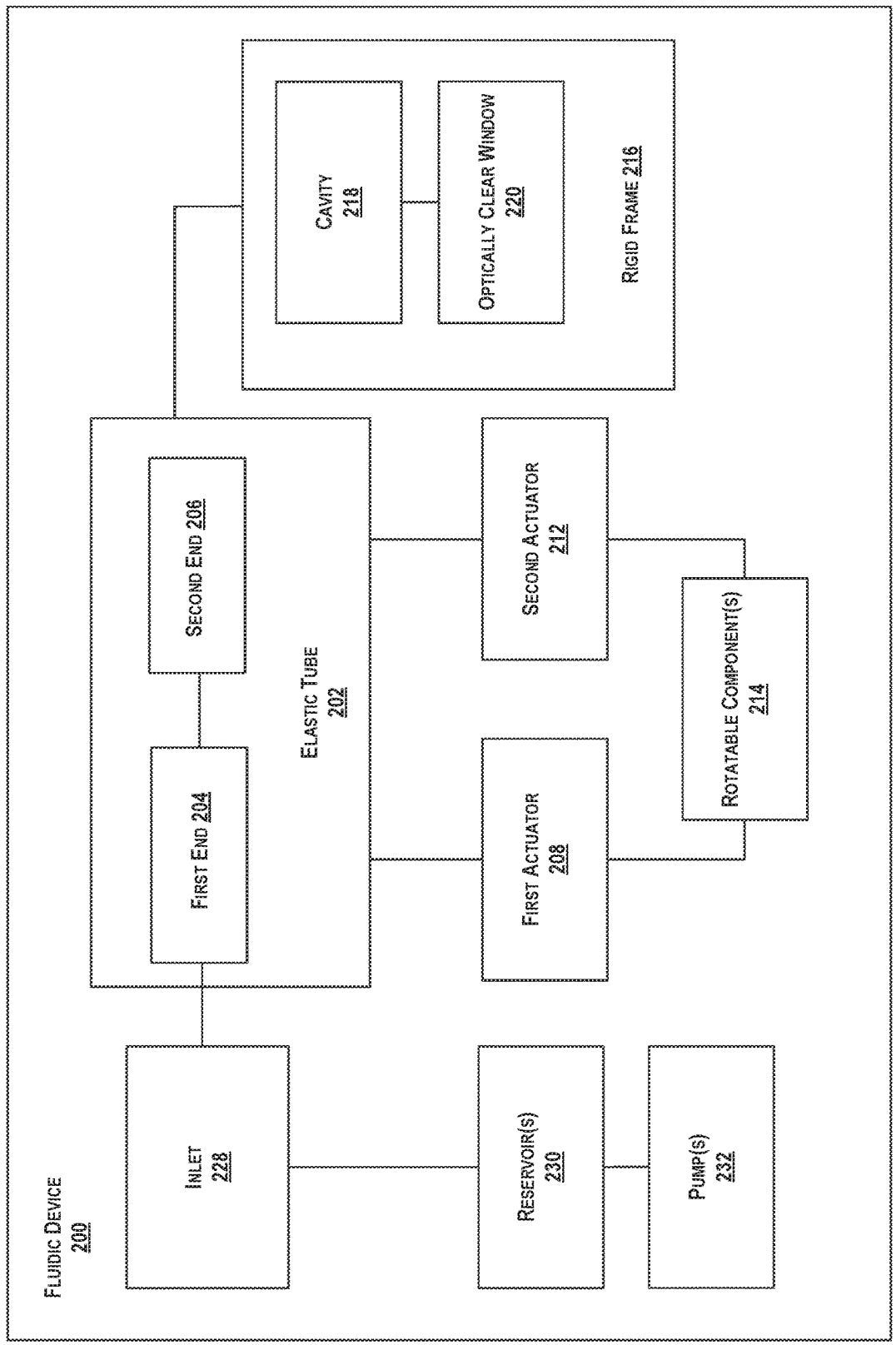
FIG. 2 illustrates a simplified block diagram of a fluidic device, according to an example embodiment.

In FIG. 2, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 2 may be combined in various ways without the need to include other features described in FIG. 2, other drawing figures, and/or the accompanying disclosure, even though such combination or combinations are not explicitly illustrated herein. Similarly, additional features not limited to the examples presented, may be combined with some or all of the features shown and described herein.

Figure 7:
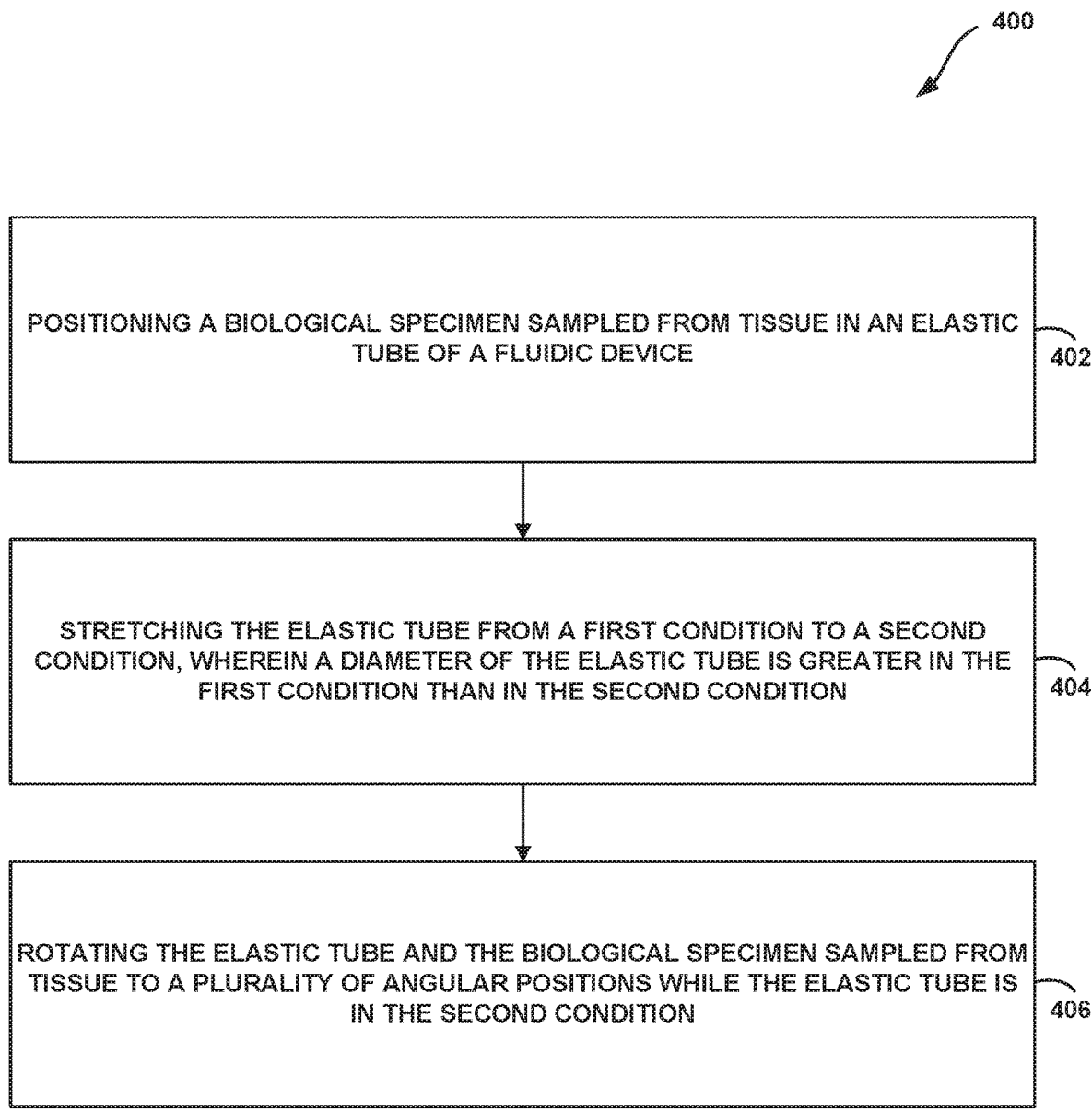
FIG. 7 is a flowchart illustrating an example method according to an example embodiment.

In FIG. 7, referred to above, the blocks may represent operations and/or portions thereof and lines connecting the various blocks do not imply any particular order or dependency of the operations or portions thereof. It will be understood that not all dependencies among the various disclosed operations are necessarily represented. FIG. 7 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one embodiment" or "one example" means that one or more feature, structure, or characteristic described in connection with the example is included in at least one implementation. The phrases "one embodiment" or "one example" in various places in the specification may or may not be referring to the same example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

As used herein, with respect to measurements, "about" means +/−5%.

As used herein, with respect to measurements, "substantially" means +/−5%.

As used herein, "biological specimen sampled from tissue" and "biological specimen" means a sample taken from a biological tissue. The sample of biological tissue may constitute a biopsy, which can be a fine needle aspiration biopsy (FNA or FNAB), a core needle biopsy (CNB), or a surgical (open) biopsy.

As used herein, "threshold flow rate" comprises an instantaneous flow rate in the elastic tube at which the biological specimen moves through the elastic tube.

The present disclosure provides fluidic devices, systems, and methods for use that enables microscopic imaging around the circumferential surface of a biological specimen sampled from tissue. In particular, as shown in FIGS. 1A-1E, the system includes a fluidic device 100 with a rigid frame 102 and a corresponding imaging device 104 for imaging of the biopsy specimen. The rigid frame 102 may be disposable and optically clear, and may include an elastic tube 106 pre-tensioned across the middle of the rigid frame 102. Fluidic channels in the rigid frame 102 connect seamlessly to the inside of the elastic tube 106. The elastic tube 106 is fluidically sealed and fixed to the rigid frame 102. Sufficient space where the elastic tube 106 is not constrained allows the elastic tube to be rotated +/−180 degrees, and further enables the elastic tube 106 to be axially stretched, as discussed in additional detail below. Two actuators 108, 110 on either side of the imaging field of view (FOV) are connected to the outer diameter of the elastic tube 106, and allow the fluidic device 100 to manipulate the elastic tube 106 in an axial direction. The fluidic device 100 also includes one or more rotatable components 114 coupled to the actuator(s) 108, 110 that enables the fluidic device 100 to manipulate the elastic tube 106 in a rotational direction.

The fluidic device 100 provides fluid flow to move the biological specimen 101 into the elastic tube 106 portion of the rigid frame 102. A pump (e.g., a solenoid dosing pump) may be used for controlled movement of the biological specimen via fluid flow, providing solutions such as phosphate buffered saline (PBS), staining solutions, fixative, and potential optical clearing agents. As shown in FIG. 1A, PBS may be used to position the biological specimen 101 in a portion of the elastic tube 106 positioned between the two actuators 108, 110. As shown in FIG. 1B, the fluidic device 100 may then flow staining solution(s) through the elastic tube 106), and then rinses out excess stain. For surface imaging of the biological specimen 101, only a brief exposure (e.g., seconds) to the staining solution is required before imaging. For deeper tissue imaging, the biological specimen 101 will be exposed to the staining solution and possibly an optical clearing agent for longer periods of time before imaging. In several embodiments, whether the fluidic device 100 is used for surface imaging or for deeper imaging of the biological specimen 101, the entire cylindrical surface of the biological specimen 101 needs to be rotated during the process of imaging. To accomplish this, the elastic tube 106 may be axially stretched by the actuators 108, 110 which reduces the inner diameter of the elastic tube 106 to gently compress and hold the biopsy specimen 101, as shown in FIG. 1C.

In at least one embodiment, the imaging device 104 (e.g., an objective lens) can be brought up to the surface of the elastic tube 106, as shown in FIG. 1D. During the imaging process, the biological specimen 101 is moved axially so that the entire length of the elongated biological specimen 101 is imaged, and then the biological specimen is rotated a step (such as 5 to 15 degrees depending on the imaging device and resolution required), and then the entire length of the biological specimen 101 is imaged again. This process is repeated until the complete outer cylindrical surface biological specimen 101 has been imaged as a series of axial strips that can be stitched into one mosaic by a computer system recording all camera images from the optical microscope.

In at least one embodiment, the biological specimen 101 can be rotated at least +/−180 degrees in a series of steps, at each axial position of the biological specimen 101 within the microscope working distance and imaging device 104 FOV. After the complete panoramic image of the biological specimen 101 is acquired, the compression holding the biological specimen 101 is released by decreasing the tension on the elastic tube 106 by moving the actuators 108, 110. By flushing with fixative, the biological specimen 101 will be exited from the device and can be put into the conventional work flow of a pathology lab, as shown in FIG. 1E.

Due to optical scattering, there is an advantage in rotating the biological specimen 101 for 3D imaging as it reduces the maximum depth of imaging (optical path-length in tissue) in half. Rotation also provides advantage in common cases where optical resolution along the optical axis is poorer than the lateral in-plane axes. Furthermore, in several embodiments, the biological specimen 101 can be rotated to provide best in-plane resolution for any feature of interest.

The fluidic device 100 and rapid biological specimen preparation technique lends itself well to Microscopy with Ultraviolet Sectioning Excitation (MUSE) using the MUSE Microscopy system, since the deep UV excitation only penetrates 5-10 microns into the surface of the biological specimen. In several embodiments, the entire outer surface of the (approximately cylindrical) biological specimen 101 can be imaged as the specimen is rotated. Since the cylindrical surface is equal to π times the outer diameter times the length of the biological specimen 101, this is slightly larger in area that the traditional method of taking three thin sections lengthwise of the paraffin-embedded biological specimen to make a cancer diagnosis.

FIG. 2 illustrates an example fluidic device 200. The fluidic device 200 may be similar to the structure described above for the fluidic device 100 in relation to FIGS. 1A-1E, and may be used in a similar manner as the steps described above in relation to FIGS. 1A-1E. With reference to FIG. 2, the fluidic device 200 may include an elastic tube 202 having a first end 204 and a second end 206. The fluidic device 200 also includes a first actuator 208 coupled to an outer surface of the elastic tube 202 between the first end 204 and the second end 206 of the elastic tube 202. The fluidic device 200 also includes a second actuator 212 coupled to the outer surface of the elastic tube 202 between the first actuator 208 and the second end 206 of the elastic tube 202. The first actuator 208 and the second actuator 212 are configured to move apart from one another to transition a portion of the elastic tube 202 positioned between the first actuator 208 and the second actuator 212 from a first condition to a second condition. The first condition may be a partially stretched condition, as the elastic tube 202 may be pre-tensioned to ensure that the elastic tube 202 is straight. The second condition may be a more highly stretched condition. A diameter of the portion of the elastic tube 202 positioned between the first actuator 208 and the second actuator 212 is greater in the first condition than in the second condition. The fluidic device 200 also includes one or more rotatable components 214 coupled to the first actuator 208 and the second actuator 212. The one or more rotatable components 214 are configured such that a rotation of the one or more rotatable components 214 causes the portion of the elastic tube 202 positioned between the first actuator 108 and the second actuator 212 to rotate.

Figure 3:
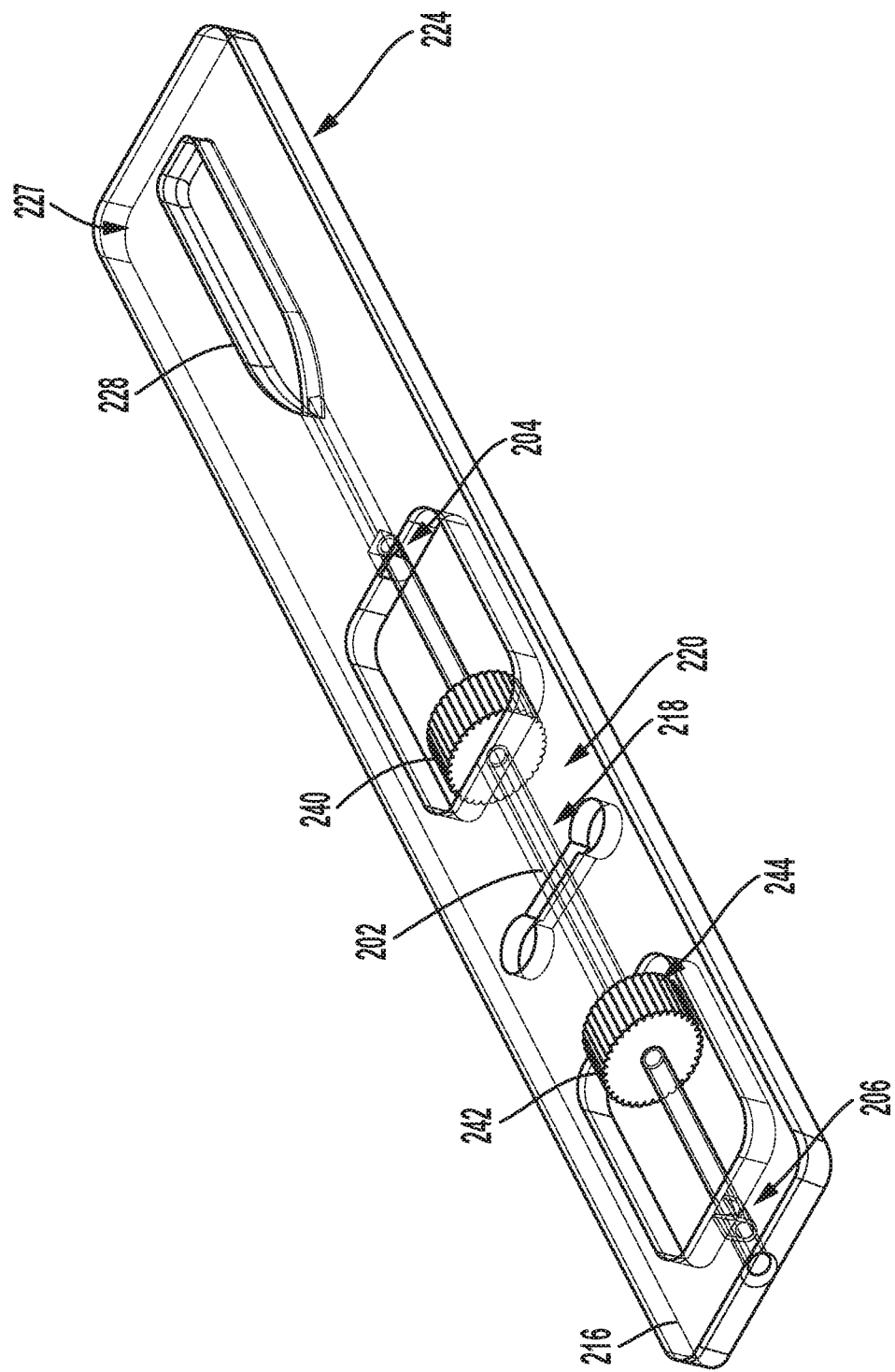
FIG. 3 is a perspective view of an example fluidic device, according to an example embodiment.

In one example, the fluidic device 100 further includes a rigid frame 216 coupled to the elastic tube 202. An example of such a rigid frame 216 is shown in FIG. 3. The rigid frame may comprise an optically clear plastic material. The rigid frame 216 may also include a cavity 218 positioned around the portion of the elastic tube 202 positioned between the first actuator 208 and the second actuator 212. The cavity 218 may include a fluid that is refractive index-matched with a material of the elastic tube 202. Such a fluid may help avoid optical distortions due to the fact that the elastic tube 202 has a curved surface. An example of such a fluid is silicone oil of moderate viscosity. The rigid frame 216 may also include an optically clear window 220 positioned over the cavity 218 of the rigid frame 216. The clear window 220 provides a viewing area for microscopic imaging, as discussed in additional detail below. The elastic tube 202 and the rigid frame 216 may be transparent to both ultra-violet light and visible light, for example at or around 285 nm. Polydimethylsiloxane (PDMS) silicones generally have good transmission at 285 nm, as well as optically clear plastics suitable for injection molding, such as cyclic olefin copolymer (e.g., UV-grade TOPAS® 8007X10).

As shown in FIG. 3, the fluidic device 100 may also include an inlet 228 in fluid communication with the first end 204 of the elastic tube 202. In one example, the inlet 228 is funnel shaped to receive a biological specimen sampled from tissue. The fluidic device 100 may also include one or more reservoirs 230 each in fluid communication with the inlet 228. The one or more reservoirs 230 each include a different fluid selected from the group consisting of phosphate buffered saline (PBS), a staining solution, a fixative, and an optical clearing agent. The fluidic device 100 may also include one or more pumps 232 in fluid communication with the one or more reservoirs 230. In at least one embodiment, short, high velocity bursts of fluid provided by a solenoid driven pump for initiating and controlling movement of the biological specimen through the elastic tube 202. The busts can move the biological specimen in small steps or in a continuous manner if the dwell time between bursts is reduced. In another example, the solutions required for sample preparation, such as PBS and dye solutions and fixative, can be pre-loaded into one or more reservoirs 230 in the rigid frame 216. Such an embodiment provides a simpler version of the device for use in environments where insufficient infrastructure (lack of solutions) is an issue. In such an example, after sealing the biological specimen within the elastic tube 202, manual or finger-activated pumps can be used to move the solutions from the one or more reservoirs 230 into the elastic tube 202 to contact the biological specimen.

Figure 4:
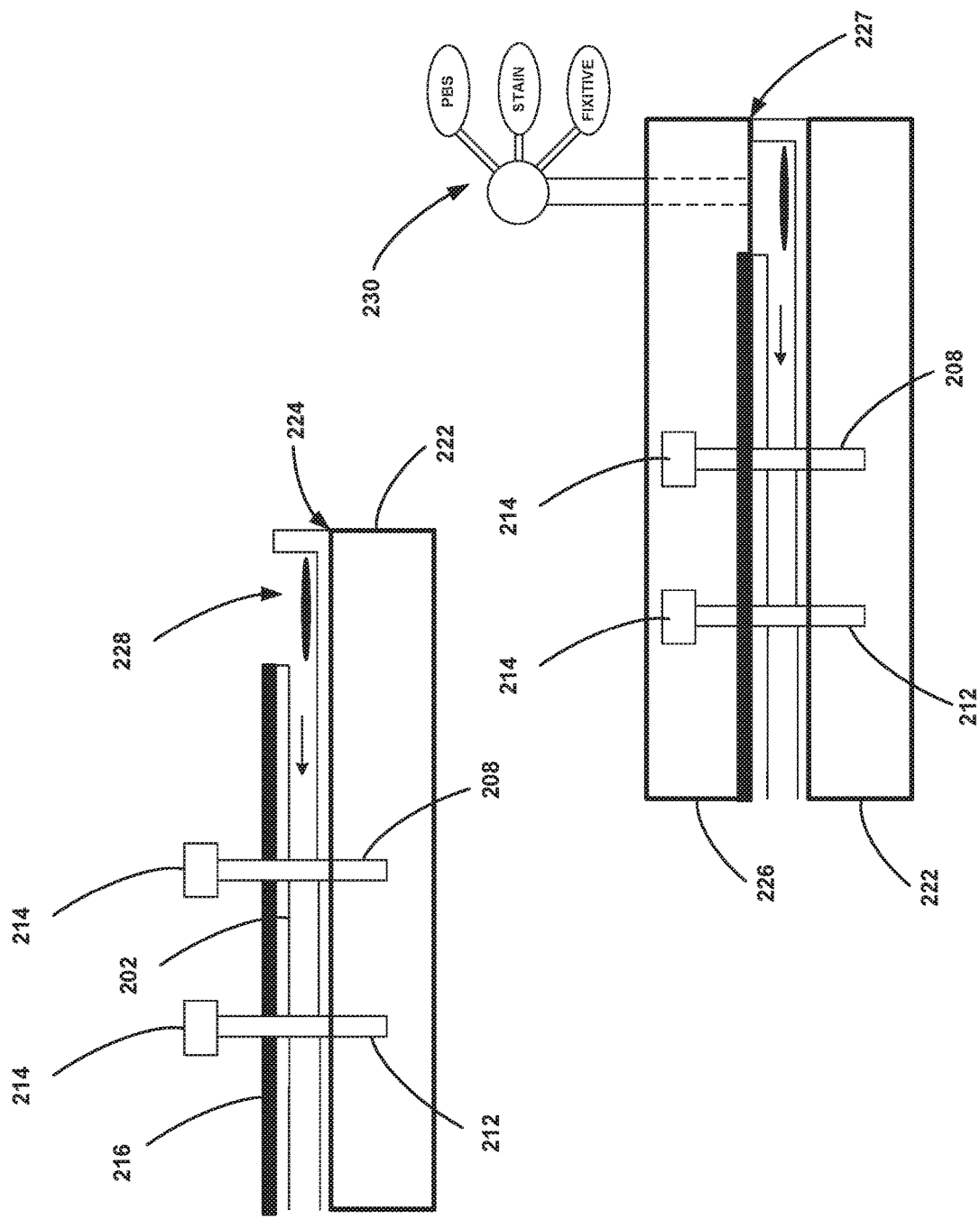
FIG. 4 is a simplified block diagram of another example fluidic device, according to an example embodiment.

In one example, as shown in FIG. 4, the fluidic device 100 further comprises a base 222 removably coupled to a bottom surface 224 of the rigid frame 216, and a lid 226 removably coupled to a top surface 227 of the rigid frame 216. The base 222 and the lid 226 are removably coupled to one another to seal the rigid frame 216 and elastic tube 202 between the base 222 and the lid 226. In such an example, the biological sample is loaded into the elastic tube 202, and then the lid 226 is closed to seal the rigid frame 216 between the base 222 and the lid 226. This causes an inlet 228 in fluid communication with the first end 204 of the elastic tube 202 to be closed off with a compression seal, and the elastic tube 202 can then be connected to one or more reservoirs 230 in fluid communication with the inlet 228 and one or more pumps 232 in fluid communication with the one or more reservoirs 230. Additionally, the lid 226 may include the one or more rotatable components 114, such that when the lid 226 is attached to the base 222, the one or more rotatable components 114 are coupled to the first actuator 108 and the second actuator 212.

The length of the portion of the elastic tube 202 positioned between the first actuator 208 and the second actuator 212 may range from, about 10 mm to about 60 mm. The portion of the elastic tube 202 positioned between the first actuator 208 and the second actuator 212 has an inner diameter ranging from about 0.5 mm to about 5 mm. Further, a ratio of an inner diameter of the portion of the elastic tube 202 positioned between the first actuator 208 and the second actuator 212 in the first condition (e.g., partially stretched condition) to an inner diameter of the portion of the elastic tube positioned between the first actuator and the second actuator in the second condition (e.g., a more highly stretched condition) ranges from about 1.5:1 to about 3:1.

Axial stretching of the elastic tube 202 may provide up to 2.5× change in the inner diameter of the elastic tube 202 with circular cross-section, depending on the elasticity and elongation specification of the material. The wall thickness of the elastic tube 202 also plays a role in determining the forces applied to the biological specimen at a given inner diameter. Light compression on the biological specimen tissue surface, enough to keep the biological specimen in contact with the elastic tube 202, is desirable for the rotation and imaging. The slight compression on the biological specimen has the functions of holding the specimen in rigid body rotation with the elastic tube 202 and thins the liquid layer between the elastic tube 202 and tissue of the biological specimen. The soft compression of the elastic tube 202 under tension allows the fragile biological specimen to be held together uniformly while rotational forces are applied evenly along the entire axial length of the biological specimen. This method allows the biological specimen to be in physiological buffer while being gently held, imaged, and rotated, all during the same automated process. Furthermore, the encapsulation of the biological specimen during the rotation and imaging has little risk of losing cells or damaging the tissue surface.

The first actuator 208 and the second actuator 212 may take a variety of forms. In one example, the first actuator 208 comprises a first linear actuator that is coupled to the elastic tube 202, and the second actuator 212 comprises a second linear actuator that is coupled to the elastic tube 202. In another example, first actuator 208 comprises a first protrusion coupled to the elastic tube 202, the second actuator 212 comprises a second protrusion coupled to the elastic tube 202, and a rod two directions of threading on it is coupled to the first protrusion and the second protrusion. A motor may be configured to rotate the rod to move the first and second protrusions equally in opposite directions to thereby stretch the elastic tube 202.

Figure 5:
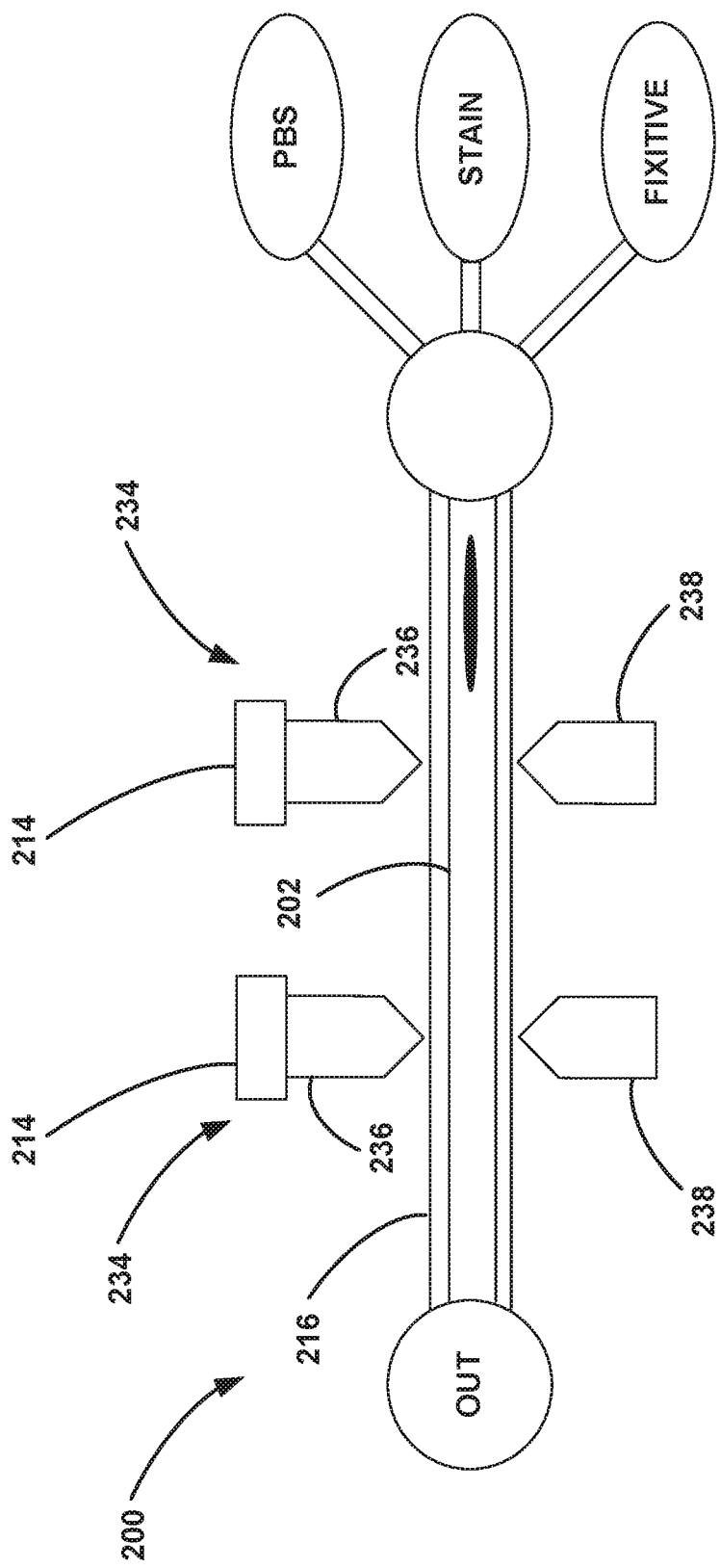
FIG. 5 is a simplified block diagram of another example fluidic device, according to an example embodiment.

In another example, as shown in FIG. 5, the first actuator 208 and the second actuator 212 each comprise a gripping mechanism 234 including a first jaw 236 positioned on a first side of the elastic tube 202 and a second jaw 238 positioned on an opposite second side of the elastic tube 202. The gripping mechanism 234 is configured to transition from an open condition in which the first jaw 236 and the second jaw 238 are spaced apart to a closed condition in which the first jaw 236 and the second jaw 238 contact the elastic tube 202. In one particular example, the gripping mechanism 234 may comprise a robotic end effect that grips the elastic tube 202.

The gripping mechanisms 234 may be configured to move apart from one another to stretch the elastic tube 202 to transition the portion of the elastic tube 202 positioned between the first actuator 208 and the second actuator 212 from a first condition to a second condition. In one example, the gripping mechanisms 234 may be further configured to rotate the elastic tube 202. As such, the actuators 208, 212 and the one or more rotatable components 214 may comprise a single entity that is able to both stretch the elastic tube 202 and rotate the elastic tube 202. In another example, the actuators 208, 212 and the one or more rotatable components 214 are separate components that interact with one another.

The gripping mechanisms 234 may further enable cleavage of the biological specimen within the elastic tube 202 into two or more pieces using a non-direct contact method. Given the biohazard of human tissue prior to fixation, such a non-contact method is preferable. A portion of the biological specimen may be delivered post imaging and pre-fixation for the added benefit of other analysis methods such as culturing, genomic, proteomic, and other 'omics analyses. During this process, pinching the elastic tube 202 provides a means of precisely halting any unwanted downstream motion of the biological specimen during processes such as imaging, rinsing, staining, clearing, and any other chemically modification the specimen.

The one or more rotatable components 214 may take a variety of forms. In one example, the one or more rotatable components 214 comprise a single rotatable component coupled to both the first actuator 208 and the second actuator 212. For example, the single rotatable component could be a single motor that is coupled to both the first actuator 208 and the second actuator 212. As the single motor rotates, that rotation is translated to a rotation of the elastic tube 202. In another example, the one or more rotatable components 214 comprise a first rotatable component coupled to the first actuator 208 and a second rotatable component coupled to the second actuator 212. Other examples are possible as well.

In another example, as shown in FIG. 3, the fluidic device 200 further includes a first disc 240 fixedly coupled to the outer surface of the elastic tube 202 between the first end 204 and the second end 206 of the elastic tube 202. The first disc 240 is configured to be coupled to the first actuator 208, and the first actuator 208 is configured to move the first disc 240 in a first direction. In such an example, the fluidic device 200 also includes a second disc 242 fixedly coupled to the outer surface of the elastic tube 202 between the first actuator 208 and the second end 206 of the elastic tube 202. The second disc 242 is coupled to the second actuator 212, and the second actuator 212 is configured to move the second disc 242 in a second direction that is opposite the first direction to thereby transition the portion of the elastic tube 202 positioned between the first actuator 208 and the second actuator 212 from the first condition to the second condition. In one example, an outer surface of the first disc 240 and an outer surface of the second disc 242 include a plurality of ridges 244. The one or more rotatable components 214 include complementary ridges configured to interact with the plurality of ridges 244 of the first disc 240 and second disc 242 to thereby translate a rotation of the one or more rotatable components 214 to a rotation of the first disc 240 and a rotation of the second disc 242, which is then translated to a rotation of the portion of the elastic tube 202 positioned between the first actuator 208 and the second actuator 212.

In certain embodiments, such as shown in any one of FIGS. 1A-5, example fluidic devices may be made using an additive-manufacturing process, such as stereolithography, 3D printing, 3D scanned polymerization; or more traditional methods of molding or casting. As such, the example fluidic devices described above may include a variety of materials, including poly(dimethylsiloxane) (PDMS) which can be optically clear in thin thicknesses from 250 nm (ultra violet) to 1600 nm (infrared) wavelength range, as examples. In one example, the additive-manufacturing process is a multi-material additive-manufacturing process such that various components of the fluidic device 100 may be formed using a material with a greater elasticity than the other components. For example, the elastic tube 202 may be created with a material having greater elasticity than the rigid frame 216 of the fluidic device 200. Other examples are possible as well.

Each of the components of the fluidic device 200 described in FIGS. 2-5 may represent a module, a segment, or a portion of program code, which includes one or more instructions executable by a processor or computing device for creating such devices using an additive-manufacturing system. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

Figure 6:
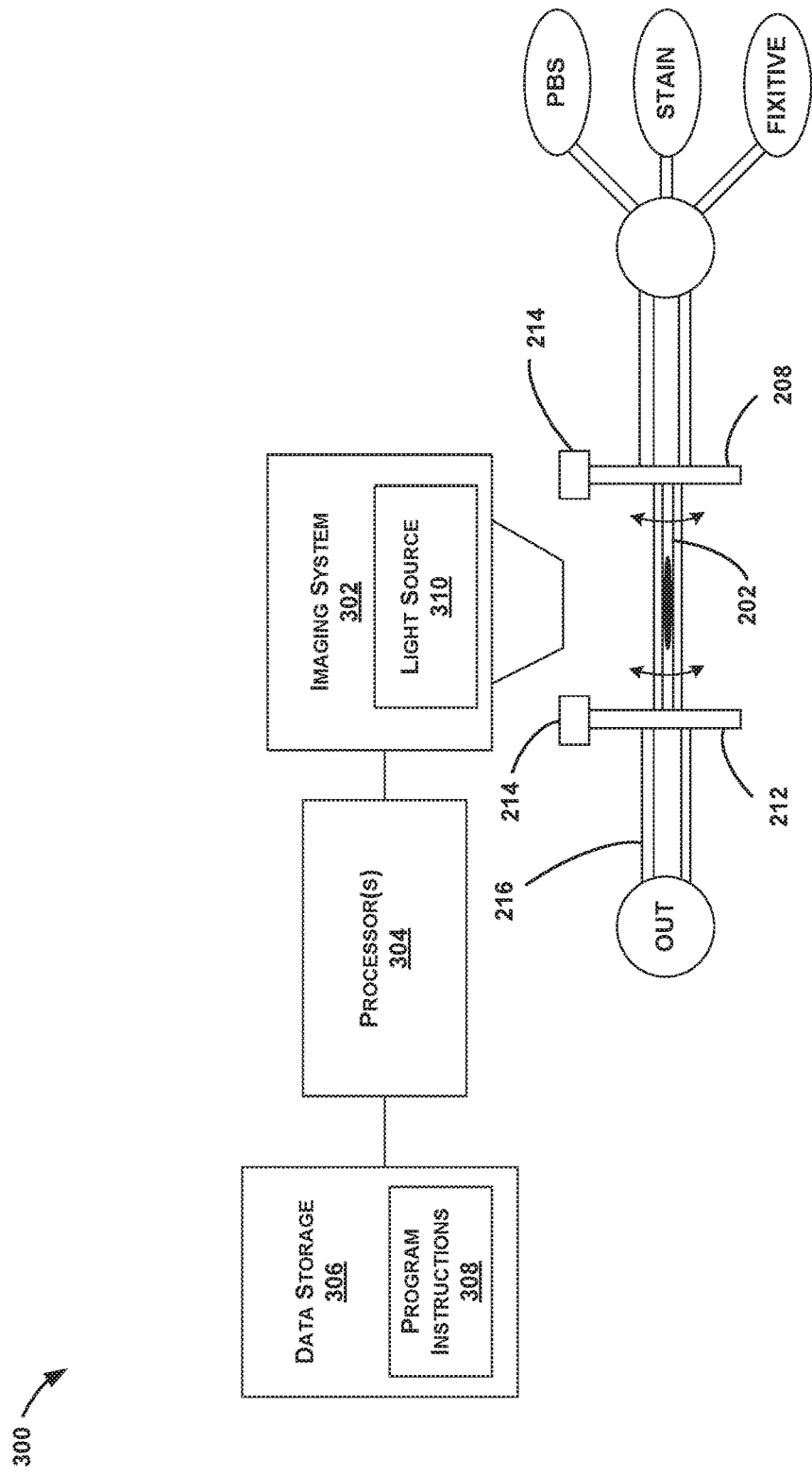
FIG. 6 illustrates an example system, according to an example embodiment.

FIG. 6 illustrates an example system 300, according to an example embodiment. As shown in FIG. 6, the system 300 may include the fluidic device 100, 200 as described in FIGS. 1A-5, an imaging device 302 positioned adjacent to the portion of the elastic tube 202 positioned between the first actuator 208 and the second actuator 212, at least one processor 304, and data storage 306 including program instructions 308 stored thereon that when executed by the at least one processor 304, cause the system 300 to perform functions.

In one example, the functions include (i) position a biological specimen sampled from tissue in the portion of the elastic tube 202 positioned between the first actuator 208 and the second actuator 212, (ii) increase, via the first actuator 208 coupled to the elastic tube 202 and the second actuator 212 coupled to the elastic tube 202, a distance between the first actuator 208 and the second actuator 212 to thereby transition the portion of the elastic tube 202 positioned between the first actuator 208 and the second actuator 212 from a first condition to a second condition, wherein a diameter of the portion of the elastic tube 202 positioned between the first actuator 208 and the second actuator 212 is greater in the first condition than in the second condition, and (iii) rotate, via one or more rotatable components 214 coupled to the first actuator 208 and the second actuator 212, the portion of the elastic tube 202 positioned between the first actuator 208 and the second actuator 212 including the biological specimen sampled from tissue to a plurality of angular positions.

The imaging device 302 may take many forms, including but not limited to, a smartphone camera, an all-purpose digital camera, a machine vision camera (e.g., a CCD, or CMOS sensor with an attached variable or fixed focus lens or positioner), or a standalone optoelectric component, such as an LED transmitter and a photodiode, a phototransistor, or a photoresistor detector (e.g., transmitter-detector couples). Such an imaging device 302 may be configured to measure various properties of the biological specimen, for example reflectance, fluorescence, absorbance or transparency of the biological specimen. The imaging device 302 may further include a light source 310, such as a deep ultra-violet (UV) light source as an example and measure excited fluorescence from one or more optical stains. Other light sources 310 having longer or shorter wavelengths are possible as well.

In one example, the program instructions 308 are further executable by the at least one processor 304 to cause the system 300 to (i) capture, via the imaging device 302, one or more images of the biological specimen sampled from tissue at each of the plurality of angular positions, and (ii) sum each image to create a three-dimensional image of the biological specimen sampled from tissue. In another example, the program instructions 308 are further executable by the at least one processor 304 to cause the system 300 to (i) capture, via the imaging device 302, a video of the biological specimen sampled from tissue at each of the plurality of angular positions, and (ii) create, using the video of the biological specimen sampled from tissue, a three-dimensional image of the biological specimen sampled from tissue. As a cautionary measure to prevent excess movement of the elastic tube 202 spanning the field of view for microscopic imaging, in one embodiment, the elastic tube 202 may be lowered slightly after axial stretching to eliminate the gap between the optically clear window 220 and the elastic tube 202. This makes the focal plane position more predictable, and prevents movement due to external vibrations.

In at least one embodiment, by imaging small sections of the elongated cylindrical specimen in time series, such as axial or circumferential strips, the neighboring subsequent strip can be stitched into a growing panoramic image by matching corresponding invariant local feature points that are present in both image strips, such as the overlapping region using the at least one processor 304, the data storage 206, and/or the program instructions 308. Since the biological specimen is dimensionally stable with high density of features, and there is a restricted order of the series of images, computer vision algorithms can be used to rapidly stitch into a panoramic image. A blending algorithm can be used to smooth slowly varying differences in brightness at the seam between images. An example computer vision algorithm that detects and describes local features in images is scale invariant feature transform (SIFT) or speeded-up robust features (SURF) for more efficient computation. Other machine vision algorithms can be employed to detect the presence of the biological specimen within the image chamber of the elastic tube and feedback on the staining procedure to achieve optimal image contrast.

In one example, positioning the biological specimen sampled from tissue in the elastic tube 202 in the portion of the elastic tube 202 positioned between the first actuator 208 and the second actuator 212 comprises (i) inserting a needle into an inlet 228 in fluid communication with the first end 204 of the elastic tube 202 and expelling the biological specimen sampled from tissue from the needle, (ii) providing a fluid to the elastic tube 202 to contact the biological specimen sampled from tissue, wherein a flow rate of the fluid through the elastic tube 202 is greater than a threshold flow rate, and wherein the biological specimen sampled from tissue passes through the elastic tube 202 when the flow rate is greater than the threshold flow rate, and (iii) once the biological specimen sampled from tissue is positioned in the portion of the elastic tube 202 positioned between the first actuator 208 and the second actuator 212, reducing the flow rate of the fluid to be less than the threshold flow rate. The threshold flow rate may range from about 3 mL/min to about 7 mL/min. In one particular example, pulsatile flow via a solenoid pump may be used to move the biological specimen through the fluidic device 200. The pulses may last about 0.05 seconds in one particular example, although other pulse lengths are possible as well. The pulses of fluid flow move the biological specimen through the fluidic device 200. As such, the threshold flow rate ranging from about 3 mL/min to about 7 mL/min may be a range of instantons flow rates.

The fluid used to move the biological specimen through the elastic tube is selected from a group consisting of optical gels, water, concentrated sucrose, glycerol-based saturated solutions/gels, dimethyl sulfoxide-based saturated solutions/gels, polyethylene glycol, and dextrose. Therefore, the fluid that is used primarily for positioning the biological specimen in the desired location in the elastic tube 202 can also have a second function, such as chemically fixing the biological tissue sample. For example, the fluid can be used to stain or label the tissue that provides selective optical contrast, such as adding absorptive stains (e.g. hematoxylin and eosin), fluorescence stains (e.g. Hoechst) or chemicals that reduce tissue optical scattering (e.g. glycerol). The biological specimen may be substantially cylindrical in one example, and the elastic tube 202 in the first condition (e.g., less stretched condition) may have a cross-sectional height that is at least about 10% greater than a cross-sectional height of the biological specimen.

In one example, as discussed above, the first actuator 208 and the second actuator 212 may each comprise a gripping mechanism 234 including a first jaw 236 positioned on a first side of the elastic tube 202 and a second jaw 238 positioned on an opposite second side of the elastic tube 202. The gripping mechanism 234 is configured to transition from an open condition in which the first jaw 236 and the second jaw 238 are spaced apart to a closed condition in which the first jaw 236 and the second jaw 238 contact the elastic tube 202. In such an example, the program instructions 308 are further executable by the at least one processor 304 to cause the system 300 to (i) transition the gripping mechanism 234 of the first actuator 208 and the gripping mechanism 234 of the second actuator 212 from the open condition to the closed condition, and (ii) increase a distance between the gripping mechanism 234 of the first actuator 208 and the gripping mechanism 234 of the second actuator 212 to thereby transition the portion of the elastic tube 202 positioned between the first actuator 208 and the second actuator 212 from the first condition to the second condition. In such an example, the program instructions 308 may be further executable by the at least one processor 304 to cause the system 300 to transition the first jaw 236 and the second jaw 238 of the first actuator from the open condition to the closed condition to sever a portion of the biological specimen sampled from tissue. In yet another example, the program instructions 308 may be further executable by the at least one processor 304 to cause the system 300 provide a second fluid to the elastic tube 202 to contact the biological specimen sampled from tissue while the gripping mechanism 234 of the first actuator 208 is in the closed condition. The second fluid may be a staining fluid, a fixative, or an optical clearing agent as non-limiting examples. By pinching one end of the elastic tube 202, a pump can be used to drive the second fluid into a dead-ended elastic tube 202. In such an arrangement, the ballooning of the elastic tube 202 provides a restoring force that can drive the second fluid back toward the pump without need of an additional pump.

In another example, as an alternative to flowing through stain continuously during the staining process, but with improved agitation and access of full concentration stain at the surface of specimen, the biological sample can be turned over in the elastic tube 202 (such as tumbled, while the elastic tube 202 is not stretched and holding specimen at this point). During this tumbling process, the fluid can be cycled back and forth to promote mixing. The fluid-specimen boundary can be agitated via rapid axial stretch-release of the elastic tube 202.

In at least one embodiment, fluid flow, shear-force can be varied such that cells are moved out of the system 300 (such as to be deposited in fixative of choice) for cytological analysis; whereas, large chunks of tissue are retained in the elastic tube 202 for imaging. Pinching the elastic tube 202 can help retain the tissue fragments. To remove a greater number of surface cells for cytological, biochemical, or mass spectrometry analysis, a chemical digestive agent or proteolytic enzyme like trypsin or papain can be flowed over the surface of the specimen to release cells. Curvature of the tube can be used to increase the force normal to the tube wall, thus increasing friction of the specimen with the tube wall. Such a curvature can be induced in this system 300 by providing a curved guide for the elastic tube 202 to be constrained by, or by other mechanical manipulation of the tube exterior. Increased friction of the biological specimen with the elastic tube wall may provide better range of fluid velocities for separation, and better control of movement.

Fine needle aspirates (FNAs) are a form of needle biopsy that are formed with small bore needles (<1 mm ID) in which the clinical process of sampling creates a slurry of mostly isolated cells. In at least one embodiment, to image these cells in the same method as a tissue encapsulated in the elastic tube 202, the cells need to be adhered to the inside of the tube and come out of solution. A specialized elastic tube 202 that is coated on the inner surface with materials that allow protein adsorption is preferred, such as a highly charged surface. For example a silicone tube with ID of >2.0 mm in diameter with a length of ≥30 mm has a surface area that will bind about 2 million cells as a monolayer, assuming a cell area is (10×10 microns). A breast FNA typically has 2 million cells while a thyroid FNA typically has <2 million cells. The different types of coatings that are known to bind cells are surfaces that have coatings of polylysine, hydrophilic silanes, hydrogels, lectins, nitrocellulose, and extra cellular matrix proteins. Vigorous mixing techniques previously described can be used to help bind FNA cells to the tube inner surface. Once bound, then the staining process can continue by flowing staining solution and more mixing. To image the cells, the elastic tube 202 is moved and rotated as described for the imaging the tissue specimens with the aid of refractive index-matching fluid. However, there is no need to stretch the elastic tube axially to achieve a smaller diameter when imaging such cells.

In one particular use case of the system 300, a core needle biopsy of 1.5 mm outer diameter and 20 mm in length is removed from the human body and dropped into the funnel chamber of the fluidic device 200 filled with PBS. If the elongated specimen is not orientated to be flushed into the channel then it can be repositioned by the tip of the needle or another device. Within fluidic device 200 including the rigid frame 216 is clamped together via the base 222 and the lid 226 to seal the elastic tube 202. Creating a pressure drop across the specimen chamber flushes the specimen into the 2.0 mm inner diameter silicone elastic tube 202 and centered in the imaging chamber of over 30 mm in length. The imaging device 302 is used to verify the presence of the specimen in the imaging chamber and provide feedback for centering the specimen in the FOV of the imaging device 302. Movement of the specimen can be affected by applying pulses of PBS at high flow rate. Once centered, the specimen is stained with fluorescence dyes pulses at low rate so the specimen does not move. The fluorescence dyes can be converted to the H&E (hematoxylin and eosin) standard of pathology. Rinsing with PBS follows staining, again with low flow rate to maintain a stationary specimen in the imaging chamber.

The motorized actuators 208, 212 engage the elastic tube 202 and apply tension to stretch the elastic tube and reduce inner, typically a 2-2.5× axial stretch can reduce the diameter up to 2×. By prior calibration for the size of the core needle biopsy, type of tissue, and choice of elastic tube, the amount of stretch is programmed to gently encapsulate the specimen. The actuators 208, 212 move the specimen to the base of the refractive index-matching fluid cavity 218 to stabilize the elastic tube 202 at a known position for optical imaging. The actuators 208, 212 slide the specimen axially to image one strip lengthwise along the specimen. After imaging, the specimen is rotated 10 degrees by rotating and slightly twisting the elastic tube 202 via the one or more rotatable components. The imaging of the neighboring strip is repeated. Before moving to the next strip the new strip is stitched to the previous strip and quality of the image is assessed by the at least one processor 304 of the system 300 and image processing algorithms. This process is repeated until all +/−180 degrees or more are imaged and recorded on the system 300. Once the panoramic image is created of the entire elongated specimen, the actuators 208, 212 release the tension on the elastic tube 202 and the compression is released from the tissue surface. A burst of chemical fixative or PBS is used to flush the specimen from the imaging chamber into a reservoir which is outside the fluidic device 200. Alternatively, the specimen can be flushed into a reservoir within the fluidic device 200 for storage and transport while in fixative.

FIG. 7 is a block diagram of an example method for preparing and transporting a biological tissue sample for pathology. Method 400 shown in FIG. 7 presents an embodiment of a method that could be used by the fluidic device 100, 200 as described in FIGS. 1A-5 and/or the system 300 described in FIG. 6, as examples. Method 700 may include one or more operations, functions, or actions as illustrated by one or more of blocks 402-406. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

Initially, at block 402, the method 400 includes positioning a biological specimen sampled from tissue in an elastic tube of a fluidic device. The fluidic device may take the form of the fluidic devices 100, 200 described above in relation to FIGS. 1A-7. At block 404, the method 400 includes stretching the elastic tube from a first condition to a second condition, wherein a diameter of the elastic tube is greater in the first condition than in the second condition. At block 406, the method 400 includes rotating the elastic tube and the biological specimen sampled from tissue to a plurality of angular positions while the elastic tube is in the second condition. In one example, the diameter of the elastic tube in the second condition is less than a diameter of the biological specimen sampled from tissue such that the biological specimen sampled from tissue is compressed when the elastic tube is in the second condition.

In one embodiment, the fluidic device includes a first actuator coupled to an outer surface of the elastic tube and a second actuator coupled the outer surface of the elastic tube. In such an example, stretching the elastic tube from the first condition to the second condition comprises increasing, via the first actuator coupled to the elastic tube and the second actuator coupled to the elastic tube, a distance between the first actuator and the second actuator to thereby transition a portion of the elastic tube positioned between the first actuator and the second actuator from the first condition to the second condition. In another embodiment, the fluidic device includes one or more rotatable components coupled to the first actuator and the second actuator. In such an example, rotating the elastic tube and the biological specimen sampled from tissue to the plurality of angular positions comprises rotating, via the one or more rotatable components, the portion of the elastic tube positioned between the first actuator and the second actuator including the biological specimen sampled from tissue to the plurality of angular positions.

In another example, the method 400 further comprises (i) capturing, via an imaging device positioned adjacent to the elastic tube including the biological specimen sampled from tissue, one or more images of the biological specimen sampled from tissue at each of the plurality of angular positions, and (ii) summing each image, to create a three-dimensional image of the biological specimen sampled from tissue. In yet another example, the method 400 further comprises (i) capturing, via an imaging device positioned adjacent to the elastic tube including the biological specimen sampled from tissue, a video of the biological specimen sampled from tissue at each of the plurality of angular positions, and (ii) creating, using the video of biological specimen sampled from tissue, a three-dimensional image of the biological specimen sampled from tissue.

The method 400 may further include moving the elastic tube and the biological specimen sampled from tissue to a plurality of linear positions while the elastic tube is in the second condition. Typically, the microscope field of view is smaller than the length of a biological specimen. This linear movement of the biological specimen prior to rotating enables the entirety of the biological specimen to be imaged.

In another example, the method 400 further includes stretching the elastic tube from the first condition to the second condition compresses the biological specimen sampled from tissue. In such an example, the compressed biological specimen sampled from tissue is substantially cylindrical. Such an arrangement makes the biological sample easier to focus on and image. In some embodiments, applying force to further flatten the biological specimen retained in the elastic tube 202 is desirable, as it will bring more of the specimen into focus given the limited depth of field for many 2D and 3D microscopic imaging applications.

In one example, positioning the biological specimen sampled from tissue in the elastic tube comprises (i) inserting a needle into an inlet in fluid communication with a first end of the elastic tube and expelling the biological specimen sampled from tissue from the needle, (ii) providing a fluid to the elastic tube to contact the biological specimen sampled from tissue, wherein a flow rate of the fluid through the elastic tube is greater than a threshold flow rate, and wherein the biological specimen sampled from tissue passes through the elastic tube when the flow rate is greater than the threshold flow rate, and (iii) once the biological specimen sampled from tissue is positioned in a desired portion of the elastic tube, reducing the flow rate of the fluid to be less than the threshold flow rate. The threshold flow rate may range from about 3 mL/min to about 7 mL/min.

Figure 8:
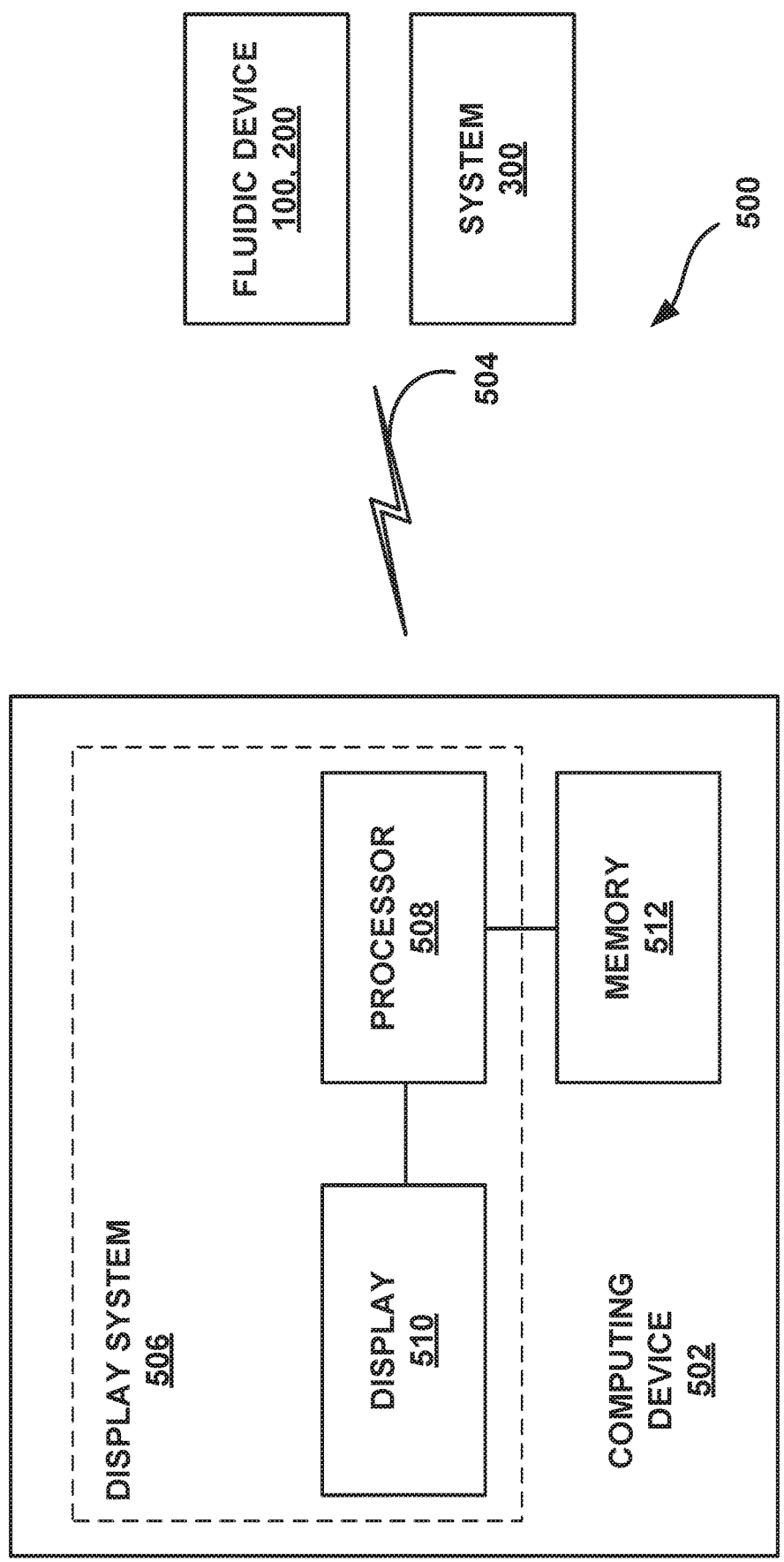
FIG. 8 illustrates a schematic drawing of a computer network infrastructure, according to an example embodiment.

FIG. 8 illustrates an example schematic drawing of a computer network infrastructure. In one system 500, a computing device 502 communicates with the fluidic devices 100, 200 as described in FIGS. 1A-5 and/or the system 300 described in FIG. 6 using a communication link 504, such as a wired or wireless connection. The computing device 502 may be any type of device that can receive data and display information corresponding to or associated with the data. For example, the computing device 502 may be a mobile phone, a tablet, or a personal computer as examples.

Thus, the computing device 502 may include a display system 506 comprising a processor 508 and a display 510. The display 510 may be, for example, an optical see-through display, an optical see-around display, or a video see-through display. The processor 508 may receive data from the fluidic device 100, 200 and/or the system 300, and configure the data for display on the display 510. Depending on the desired configuration, processor 508 can be any type of processor including, but not limited to, a microprocessor, a microcontroller, a digital signal processor, or any combination thereof.

The computing device 502 may further include on-board data storage, such as memory 512 coupled to the processor 508. The memory 512 may store software that can be accessed and executed by the processor 508, for example. Further, processor 508 may receive data from the fluidic device 100, 200 and/or the system 300, and configure the data for storage in the memory 512. The memory 512 can include any type of memory now known or later developed including but not limited to volatile memory (such as RAM), non-volatile memory (such as ROM, flash memory, etc.) or any combination thereof.

According to an example embodiment, the computing device 502 may include program instructions that are stored in the memory 512 (and/or possibly in another data-storage medium) and executable by the processor 508 to facilitate the various functions described herein. Although various components of the system 500 are shown as distributed components, it should be understood that any of such components may be physically integrated and/or distributed according to the desired configuration of the computing system.

The fluidic device 100, 200 and/or the system 300 and the computing device 502 may contain hardware to enable the communication link 504, such as processors, transmitters, receivers, antennas, etc.

In FIG. 8, the communication link 504 is illustrated as a wireless connection; however, wired connections may also be used. For example, the communication link 504 may be a wired link via a serial bus such as a universal serial bus or a parallel bus. A wired connection may be a proprietary connection as well. The communication link 504 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LIE), or Zigbee® technology, among other possibilities.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense. Further, it is intended to be understood that the following clauses (and any combination of the clauses) further describe aspects of the present description.

We claim:

1. A fluidic device comprising:
an elastic tube having a first end and a second end;
a first actuator coupled to an outer surface of the elastic tube between the first end and the second end of the elastic tube;
a second actuator coupled to the outer surface of the elastic tube between the first actuator and the second end of the elastic tube, wherein the first actuator and the second actuator are configured to move apart from one another to transition a portion of the elastic tube positioned between the first actuator and the second actuator from a first condition to a second condition, and wherein a diameter of the portion of the elastic tube positioned between the first actuator and the second actuator is greater in the first condition than in the second condition;
one or more rotatable components coupled to the first actuator and the second actuator, wherein the one or more rotatable components are configured such that a rotation of the one or more rotatable components causes the portion of the elastic tube positioned between the first actuator and the second actuator to rotate;
an inlet in fluid communication with the first end of the elastic tube; and
one or more reservoirs each in fluid communication with the inlet, wherein the one or more reservoirs include a different fluid selected from a group consisting of phosphate buffered saline, a staining solution, a fixative, and an optical clearing agent.

2. The fluidic device of claim 1, further comprising:
a rigid frame coupled to the elastic tube;
a base removably coupled to a bottom surface of the rigid frame; and
a lid removably coupled to a top surface of the rigid frame, wherein the base and the lid are removably coupled to one another to seal the rigid frame and elastic tube between the base and the lid.

3. The fluidic device of claim 2, wherein the rigid frame includes a cavity positioned around the portion of the elastic tube positioned between the first actuator and the second actuator, and wherein the cavity includes a fluid that is refractive index-matched with a material of the elastic tube.

4. The fluidic device of claim 1, wherein a length of the portion of the elastic tube positioned between the first actuator and the second actuator ranges from about 10 mm to about 60 mm, and wherein the portion of the elastic tube positioned between the first actuator and the second actuator has an inner diameter ranging from about 0.5 mm to about 5 mm.

5. The fluidic device of claim 1, wherein a ratio of an inner diameter of the portion of the elastic tube positioned between the first actuator and the second actuator in the first condition to an inner diameter of the portion of the elastic tube positioned between the first actuator and the second actuator in the second condition ranges from about 1.5:1 to about 3:1.

6. The fluidic device of claim 1, wherein the one or more rotatable components comprise either (i) a single rotatable component coupled to both the first actuator and the second actuator, or (ii) a first rotatable component coupled to the first actuator and a second rotatable component coupled to the second actuator.

7. The fluidic device of claim 1, wherein the first actuator and the second actuator each comprise a gripping mechanism including a first jaw positioned on a first side of the elastic tube and a second jaw positioned on an opposite second side of the elastic tube, and wherein the gripping mechanism is configured to transition from an open condition in which the first jaw and the second jaw are spaced apart to a closed condition in which the first jaw and the second jaw contact the elastic tube.

8. The fluidic device of claim 1, further comprising:
a first disc fixedly coupled to the outer surface of the elastic tube between the first end and the second end of the elastic tube, wherein the first disc is coupled to the first actuator, and wherein the first actuator is configured to move the first disc in a first direction; and
a second disc fixedly coupled to the outer surface of the elastic tube between the first actuator and the second end of the elastic tube, wherein the second disc is coupled to the second actuator, and wherein the second actuator is configured to move the second disc in a second direction that is opposite the first direction to thereby transition the portion of the elastic tube positioned between the first actuator and the second actuator from the first condition to the second condition.

9. A system comprising:
the fluidic device of claim 1;
an imaging device positioned adjacent to the portion of the elastic tube positioned between the first actuator and the second actuator;
at least one processor; and
data storage including program instructions stored thereon that when executed by the at least one processor, cause the system to:
  position a biological specimen sampled from tissue in the portion of the elastic tube positioned between the first actuator and the second actuator;
  increase, via the first actuator coupled to the elastic tube and the second actuator coupled to the elastic tube, a distance between the first actuator and the second actuator to thereby transition the portion of the elastic tube positioned between the first actuator and the second actuator from a first condition to a second condition, wherein a diameter of the portion of the elastic tube positioned between the first actuator and the second actuator is greater in the first condition than in the second condition; and
  rotate, via one or more rotatable components coupled to the first actuator and the second actuator, the portion of the elastic tube positioned between the first actuator and the second actuator including the biological specimen sampled from tissue to a plurality of angular positions.

10. The system of claim 9, wherein the program instructions are further executable by the at least one processor to cause the system to:
  capture, via the imaging device, one or more images of the biological specimen sampled from tissue at each of the plurality of angular positions; and
  sum each image to create a three-dimensional image of the biological specimen sampled from tissue.

11. The system of claim 9, wherein the program instructions are further executable by the at least one processor to cause the system to:
  capture, via the imaging device, a video of the biological specimen sampled from tissue at each of the plurality of angular positions; and
  create, using the video of the biological specimen sampled from tissue, a three-dimensional image of the biological specimen sampled from tissue.

12. The system of claim 9, wherein the first actuator and the second actuator each comprise a gripping mechanism including a first jaw positioned on a first side of the elastic tube and a second jaw positioned on an opposite second side of the elastic tube, wherein the gripping mechanism is configured to transition from an open condition in which the first jaw and the second jaw are spaced apart to a closed condition in which the first jaw and the second jaw contact the elastic tube, and wherein the program instructions are further executable by the at least one processor to cause the system to:
  transition the gripping mechanism of the first actuator and the gripping mechanism of the second actuator from the open condition to the closed condition; and
  increase a distance between the gripping mechanism of the first actuator and the gripping mechanism of the second actuator to thereby transition the portion of the elastic tube positioned between the first actuator and the second actuator from the first condition to the second condition.

13. The system of claim 12, wherein the program instructions are further executable by the at least one processor to cause the system to:
  transition the first jaw and the second jaw of the first actuator from the open condition to the closed condition to sever a portion of the biological specimen sampled from tissue.

14. A method comprising:
  positioning a biological specimen sampled from tissue in an elastic tube of a fluidic device;
  stretching the elastic tube from a first condition to a second condition, wherein a diameter of the elastic tube is greater in the first condition than in the second condition, and wherein the diameter of the elastic tube in the second condition is less than a diameter of the biological specimen sampled from tissue such that the biological specimen sampled from tissue is compressed when the elastic tube is in the second condition; and
  rotating the elastic tube and the biological specimen sampled from tissue to a plurality of angular positions while the elastic tube is in the second condition.

15. The method of claim 14, wherein the fluidic device includes a first actuator coupled to an outer surface of the elastic tube and a second actuator coupled the outer surface of the elastic tube, and wherein stretching the elastic tube from the first condition to the second condition comprises:
  increasing, via the first actuator coupled to the elastic tube and the second actuator coupled to the elastic tube, a distance between the first actuator and the second actuator to thereby transition a portion of the elastic tube positioned between the first actuator and the second actuator from the first condition to the second condition.

16. The method of claim 15, wherein the fluidic device includes one or more rotatable components coupled to the first actuator and the second actuator, and wherein rotating the elastic tube and the biological specimen sampled from tissue to the plurality of angular positions comprises:
  rotating, via the one or more rotatable components, the portion of the elastic tube positioned between the first actuator and the second actuator including the biological specimen sampled from tissue to the plurality of angular positions.

17. The method of claim 14, further comprising:
  capturing, via an imaging device positioned adjacent to the elastic tube including the biological specimen sampled from tissue, one or more images of the biological specimen sampled from tissue at each of the plurality of angular positions; and
  summing each image to create a three-dimensional image of the biological specimen sampled from tissue.

18. The method of claim 14, further comprising:
  capturing, via an imaging device positioned adjacent to the elastic tube including the biological specimen sampled from tissue, a video of the biological specimen sampled from tissue at each of the plurality of angular positions; and
  creating, using the video of biological specimen sampled from tissue, a three-dimensional image of the biological specimen sampled from tissue.

* * * * *